(12) United States Patent
Gebert et al.

(10) Patent No.: US 8,636,163 B2
(45) Date of Patent: Jan. 28, 2014

(54) MOTOR VEHICLE FUEL TANK

(75) Inventors: Klaus Gebert, Willich (DE); Axel Wagner, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 662 days.

(21) Appl. No.: 12/536,868

(22) Filed: Aug. 6, 2009

(65) Prior Publication Data

US 2010/0032436 A1 Feb. 11, 2010

(30) Foreign Application Priority Data

Aug. 6, 2008 (DE) .................. 10 2008 036 538

(51) Int. Cl.
*B65D 6/40* (2006.01)

(52) U.S. Cl.
USPC ................. 220/86.2; 220/601; 137/592

(58) Field of Classification Search
USPC ........ 220/86.2, 4.14, 601, 562; 285/206, 207, 285/208, 354, 386, 387, 388, 389, 189, 201, 285/221; 137/592
See application file for complete search history.

(56) References Cited

U.S. PATENT DOCUMENTS

| 5,660,206 | A | * | 8/1997 | Neal et al. ................ 137/592 |
| 5,954,367 | A | | 9/1999 | Doll et al. |
| 6,357,617 | B1 | | 3/2002 | Kido |
| 6,357,618 | B1 | | 3/2002 | Kloess et al. |
| 2003/0209905 | A1 | | 11/2003 | Pachciarz et al. |
| 2004/0124567 | A1 | | 7/2004 | Stangier |
| 2005/0045227 | A1 | | 3/2005 | Frohwein |
| 2006/0088375 | A1 | | 4/2006 | Nishiyama et al. |
| 2006/0278292 | A1 | | 12/2006 | Froitzheim et al. |

FOREIGN PATENT DOCUMENTS

| CA | 2318652 | 3/2001 |
| DE | 2440904 | 3/1976 |
| DE | 10328961 | 1/2005 |
| DE | 202005004189 | 7/2006 |
| EP | 838360 | 4/1998 |
| EP | 922602 | 6/1999 |
| EP | 1084889 | 3/2001 |
| JP | 2002137641 | 5/2002 |
| JP | 2003001698 | 1/2003 |
| JP | 2004189235 | 7/2004 |
| JP | 2007320350 | 12/2007 |

OTHER PUBLICATIONS

Machine translation of Description of Stangler (EP 1084889) from epo.org, also translation of Abstract.*
International Search Report dated Sep. 30, 2009 issued in International Patent Application No. PCT/EP2009/004348.
English translation of Korean Office Action issued Sep. 18, 2012 received in corresponding Korean Application No. 2011-7002304, 4 pgs.

* cited by examiner

*Primary Examiner* — Stephen Castellano
(74) *Attorney, Agent, or Firm* — Grossman Tucker Perreault & Pfleger, PLLC

(57) ABSTRACT

The invention relates to a motor vehicle fuel tank (1) of thermoplastics having at least one filler neck (4) not moulded on in one piece, the latter being connected in a fluid-tight manner to the fuel tank (4), wherein the filler neck (5) is inserted into an opening (5) in the fuel tank (1) and is sealed by sealing means (11) at its outer circumference relative to the fuel tank (1) in the opening (5). The filler neck (4) is clamped axially against the tank wall (2), with the seal acting radially.

9 Claims, 4 Drawing Sheets

Figure 3:
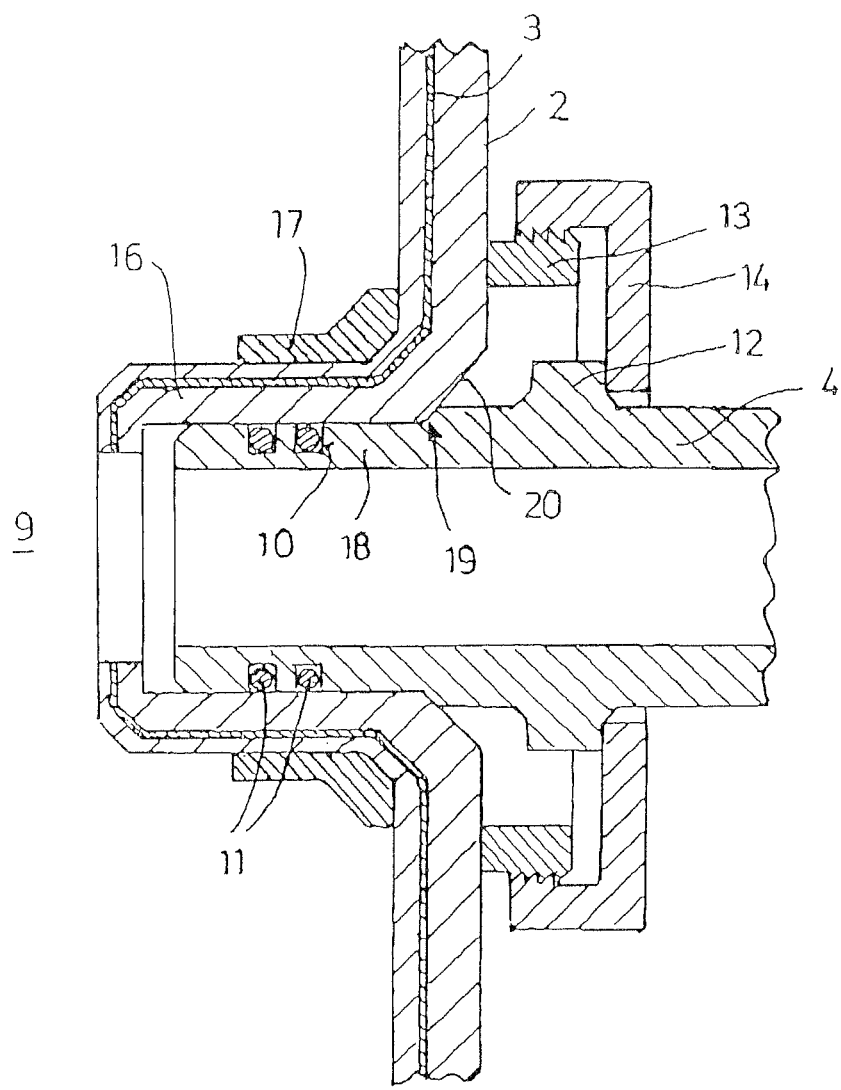

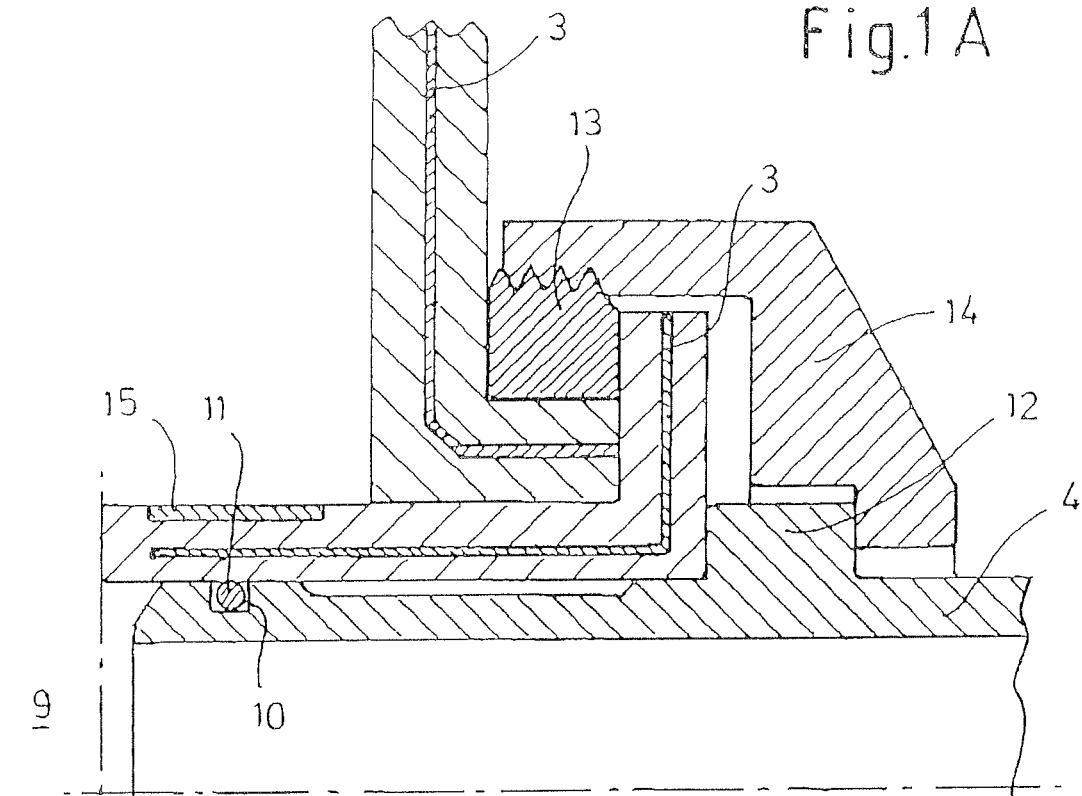
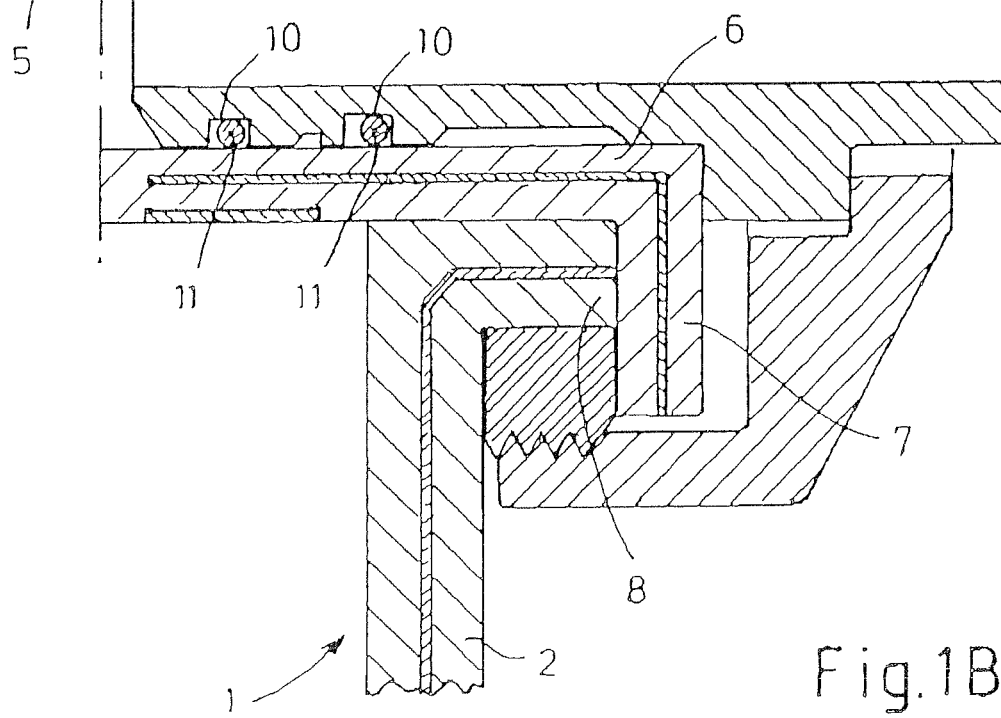

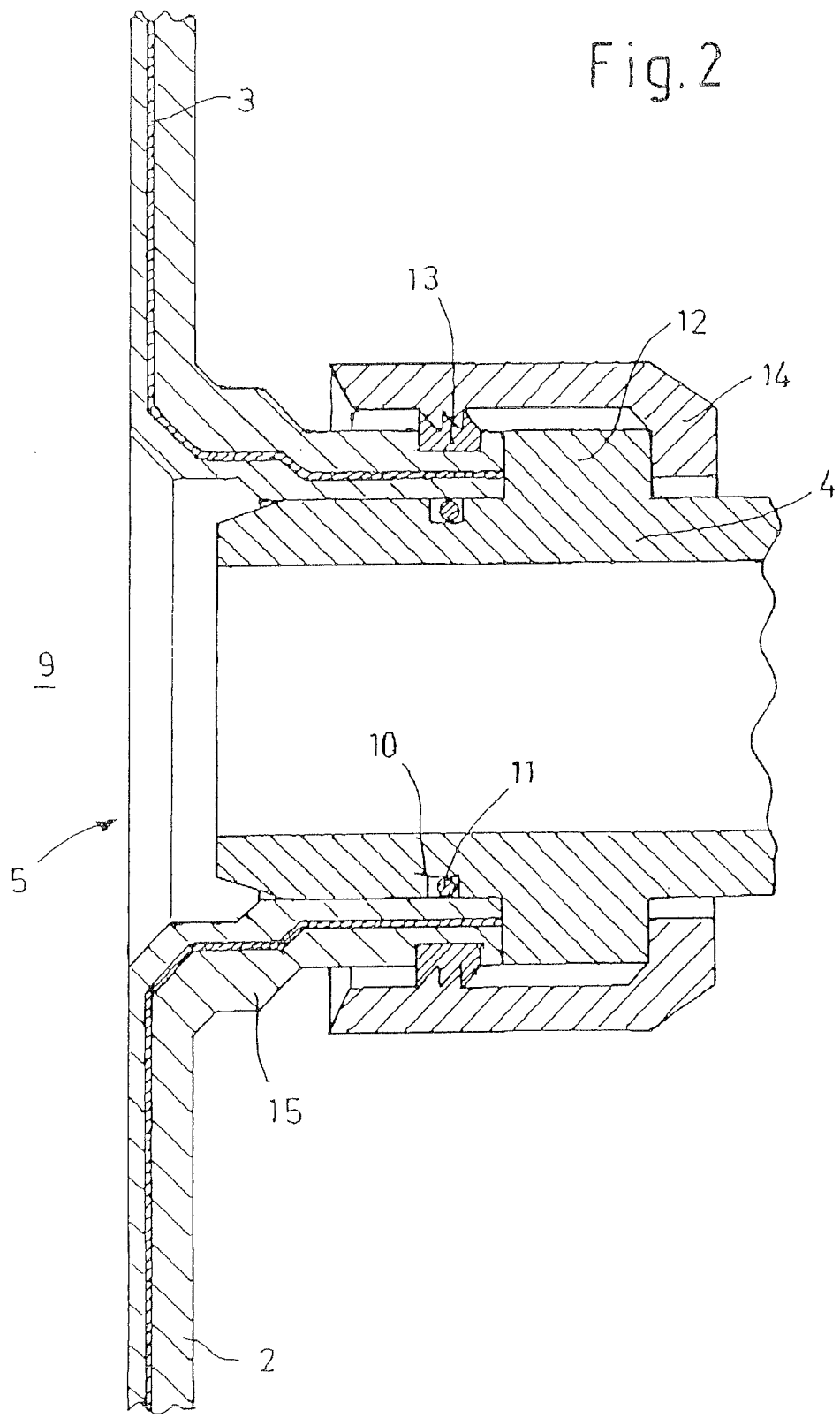

MOTOR VEHICLE FUEL TANK

The invention relates to a motor vehicle fuel tank of thermoplastics having at least one filler neck not moulded on in one piece.

Motor vehicle fuel tanks of thermoplastics have the advantage over comparable metal tanks that they may be produced in virtually any desired shape with a comparatively complex outer contour. Such tanks are relatively durable, since external mechanical influences, for example in the event of a crash, do not generally lead to lasting deformation of the plastics tank. Furthermore, such motor vehicle fuel tanks may be adapted to virtually any desired installation situation in the motor vehicle. In the case of known one-piece or one-part fuel tanks made of plastics, filler necks and air feed and extraction lines are moulded on at least partially in one piece. When producing such tanks using extrusion blow moulding, it is relatively straightforwardly possible simply to mould one or more parallel pipes onto the tank. In addition to the filler neck, it is also possible, for example, to mould on air extraction lines with bubble sections and the like in one operation.

The available fitting space in a motor vehicle does not always allow the incorporation of such tanks into the motor vehicle. If, in particular, the filling opening of the fuel tank is to be arranged a relatively long way away from the interior of the tank, a filler neck moulded on in one piece is often dispensed with to simplify fitting. The filler neck is connected to the fuel tank only when the fuel tank is fitted in the motor vehicle. As a rule, a relatively large connection fitting is provided for this purpose on the fuel tank, a resilient connecting element being clamped onto said fitting. This connecting element may for example be fastened in a gas- and liquid-tight manner to the fuel tank using clips.

However, such a connection may come away under the effects of impact-induced force, such that then liquid hydrocarbons are inevitable released. The known connections for filler necks which are not joined in one piece to the fuel tank are not very advantageous in this regard. Furthermore, sealing such subsequently produced joints between filler neck and fuel tank is problematic. Frequently, elastomeric hoses are clamped onto the connection fitting provided on the fuel tank and onto a fixedly installed filler neck. Such solutions are problematic in particular in connection with fuels containing ethanol. In this case it is no longer possible under certain circumstances to ensure complete sealing of the connection points due to the high vapour pressure of the ethanol-containing fuels.

The object of the invention is therefore to provide a motor vehicle fuel tank of thermoplastics having at least one filler neck not moulded on in one piece which does not have the above-mentioned disadvantages and which in particular allows the filler neck to be connected in such a way that potential emission paths in particular for fuels with a high vapour pressure are limited to a minimum.

The object is achieved according to the invention by a motor vehicle fuel tank of thermoplastics having at least one filler neck not moulded on in one piece, the latter being connected in a fluid-tight manner to the fuel tank, wherein the filler neck is inserted into an opening in the fuel tank and is sealed by sealing means at its outer circumference relative to the fuel tank in the opening.

The invention may be summarized to the effect that the filler neck according to the invention is introduced into the fuel tank and is sealed radially relative to the fuel tank or a insert located therein, the seal being arranged very largely inside the fuel tank. In this way, migration of liquid and/or gaseous hydrocarbons out of the fuel tank in the region of the connection of the filler neck may be reliably prevented.

The filler neck is conveniently clamped axially against the tank wall. It is particularly advantageous that sealing and fastening of the filler neck are functionally separate from one another, so ensuring a particularly effective seal.

In contrast thereto, in the case of the known connections between filler necks and fuel tanks there is no functional separation between sealing and fastening, such that the seal has under certain circumstances to withstand forces acting on the filler neck, which may lead to leaks. According to the invention, the sealing means are kept completely free of fitting forces, such that the sealing function cannot be impaired by exposure to mechanical forces.

In one variant of the fuel tank according to the invention the filler neck comprises in the region of its connection to the wall of the fuel tank at least one circumferential, flange-like collar, which is secured axially against the wall of the fuel tank by a union joint.

In a further advantageous variant of the fuel tank according to the invention, the opening in the tank wall is provided with a connecting insert, which is welded to the tank wall and relative to which the filler neck is sealed radially inside the fuel tank.

In a region projecting into the fuel tank, the connecting insert may consist at least partially of a plastic which does not swell up in the presence of liquid or gaseous hydrocarbons. In this way, it is ensured that the connecting insert's shape remains stable, so likewise ensuring a durable seal.

In a region projecting into the fuel tank, for example, the connecting insert may be provided with a circumferential band of a material resistant to liquid or gaseous hydrocarbons. Plastics such as POM, PA or ABS for example are suitable for this purpose. Such a band may consist either of a non-swellable plastics or of metal.

In an alternative variant of the fuel tank according to the invention, the opening is provided in an inwardly or outwardly protruding portion of the tank wall. The inwardly or outwardly protruding portion may likewise be encompassed by a band or a ring of a material resistant to liquid or gaseous hydrocarbons.

The tank wall and the filler neck conveniently consist of a multilayer extrudate of thermoplastics having at least one barrier layer for liquid or gaseous hydrocarbons.

Figure 4:
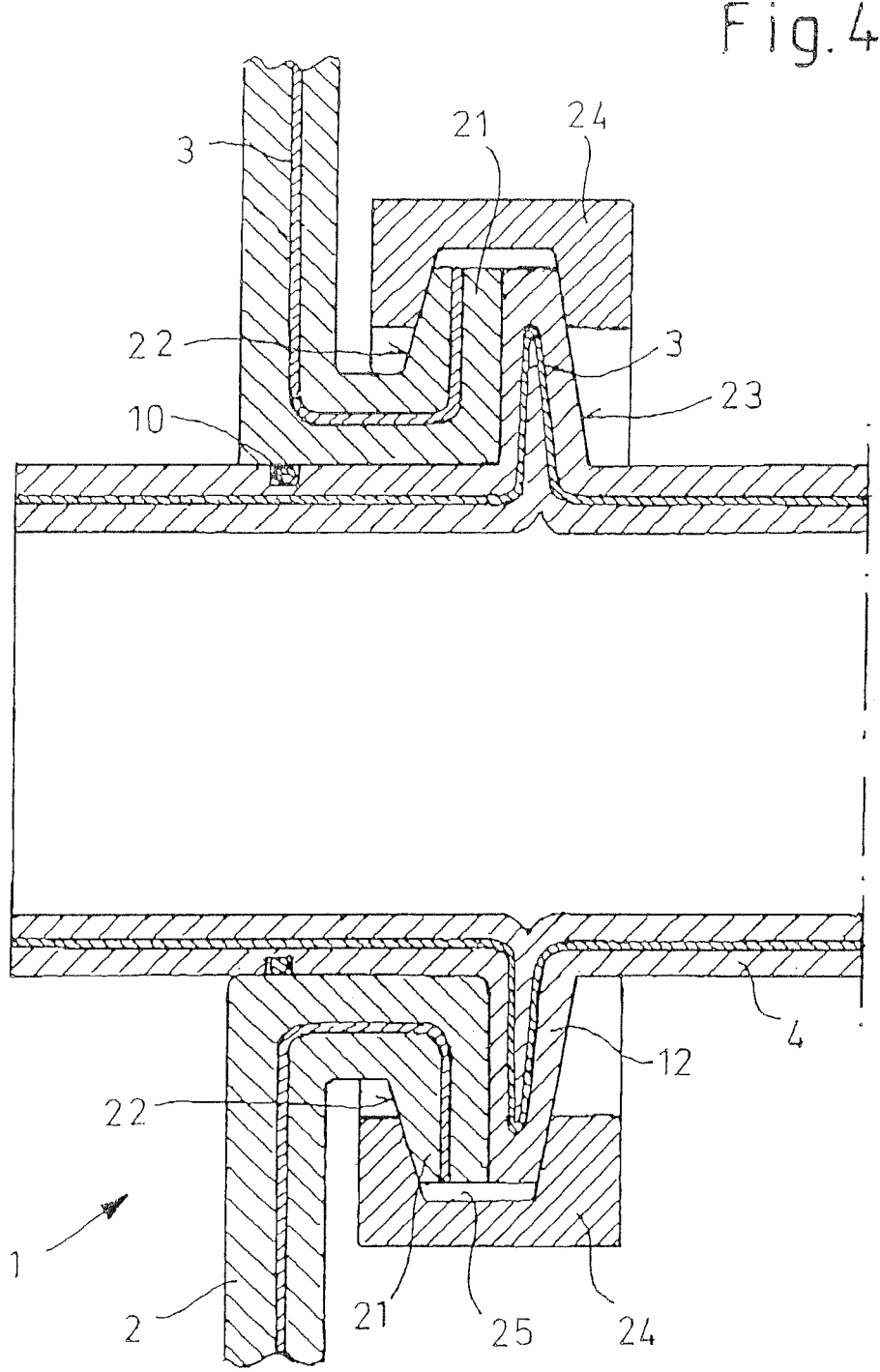

The invention will be explained below with reference to a plurality of exemplary embodiments illustrated in the drawings, in which:

FIGS. 1a, 1b show a section through the wall of a fuel tank with a filler neck inserted therein in the connection region, FIG. 2 shows a view corresponding to FIGS. 1a, 1b of a second exemplary embodiment according to the invention, FIG. 3 is a view of a third exemplary embodiment according to the invention and FIG. 4 is a view of a fourth exemplary embodiment according to the invention.

The fuel tank 1 according to the invention is blow moulded in a known manner from thermoplastics as a 6- or 7-layer coextrudate. For the sake of simplicity, the fuel tank 1 is not shown in full. Only the tank wall 2 is shown in the Figures. The precise layer structure of the extrusion blow moulded fuel tank 1 is not shown either, the Figures merely showing a barrier layer 3 against liquid and/or gaseous hydrocarbons.

The fuel tank may for example be extrusion blow moulded from a tubular extrudate. It is alternatively possible to mould it from web- or plate-shaped extrudates while they are still hot. Finally, the fuel tank according to the invention may also have been obtained from plate-shaped semifinished products by thermoforming.

To accommodate a filler neck 4, which likewise consists of thermoplastics, the tank wall 2 is provided with an opening 5, which was obtained for example by cutting a circular hole.

The filler neck 4 is only shown in the region of the end thereof which is connected to the fuel tank 1.

In the first exemplary embodiment of the invention, a connecting insert 6 has been inserted into the opening 5 in the tank wall 2. This connecting insert 6 may likewise be extrusion blow moulded. In a preferred exemplary embodiment the connecting insert 6 is compression moulded from parison waste arising during blow moulding. The layer structure of the connecting insert 6 therefore corresponds to that of the tank wall 2.

The connecting insert 6 is provided with a circumferential flange 7, which is welded to a collar 8 of the tank wall 2 surrounding the opening 5, this being done in such a way that the barrier layers 3 of the connecting insert 6 and the tank wall 2 on the other hand extend perpendicularly to one another.

The connecting insert 6, which projects with one end into the inside 9 of the tank, accommodates the end, sealed therein, of the filler neck 4. At its end surrounded by the connecting insert 6 the filler neck 4 is provided with one or more circumferential grooves 10, which each accommodate O-ring seals 11.

The filler neck 4 is likewise provided in the region where it is connected to the fuel tank 1 with a circumferential collar 12, which rests against the flange 7 of the connecting insert 6 as a limit stop. Below the flange 7 of the connecting insert 6 there is arranged a threaded ring 13, which may be of single- or multipart construction and interacts with a union nut 14. The union nut 14 engages over the collar 12 of the filler neck 4. The union nut 14 is provided with an internal thread, which interacts with the threaded ring 13. The union nut 14, which rests with its underside on the flange 7, makes it possible for the filler neck 4 to be clamped axially (relative to the longitudinal axis of the filler neck) against the tank wall 2.

FIG. 1a shows a variant of the filler neck with just one O-ring seal 11, whereas FIG. 1b shows a variant of the filler neck 4 on which two O-ring seals 11 are arranged in succession in the axial direction.

Since the connecting insert 6, as described above, may consist of thermoplastics which may swell in the presence of liquid or gaseous hydrocarbons, it is provided with a circumferential band 15 of a non-swellable material. This band 15 may consist for example of metal or a non-swellable plastics. This prevents the filler neck 4 from expanding in a transverse direction relative to the longitudinal axis thereof, such that the seal provided by the O-ring seals 11 is ensured at all times.

In the exemplary embodiments shown in FIGS. 2 and 3 components which correspond functionally to those of the exemplary embodiment illustrated in FIG. 1 are provided with identical reference numerals.

FIG. 2 shows a variant of the fuel tank 1, in which the tank wall 2 is provided with an outwardly protruding portion 15. As with the exemplary embodiment shown in FIGS. 1a, 1b, the filler neck 4 is sealed in the opening 5 within the outwardly protruding portion 15 relative to the tank wall 2 by means of an O-ring seal 11. At the outer circumference of the outwardly protruding portion 15 a threaded ring 13 is likewise provided, which is accommodated in a groove in the outwardly protruding portion 15. By means of the union nut designated 14, which interacts by means of an internal thread with the threaded ring 13, the filler neck 4 is secured axially, the union nut 14 engaging around the circumferential collar 8 of the filler neck 4. The outwardly protruding portion 15 is prevented from changing shape in that the union nut 14 engages around it.

In the exemplary embodiment illustrated in FIG. 3 the opening 5 is provided in an inwardly protruding portion 16 of the tank wall 2. Otherwise, the arrangement shown in FIG. 3 corresponds substantially to the arrangement shown in FIG. 2, the threaded ring 13 being welded to the tank wall 2, however.

The inwardly protruding portion 16 is encompassed in the inside 9 of the tank by a clamping ring 17, which prevents the inwardly protruding portion 16 from expanding in a radial direction as a result of swelling due to the action of hydrocarbons.

Furthermore, in the exemplary embodiment shown in FIG. 3 the filler neck 4 is provided with a projection 18 of reduced diameter, which forms a circumferential bevelled step 19. The step 19 lies against a circumferential shoulder 20 of the inwardly protruding portion 16 in such a way that the filler neck 4 rests with the step 19 against the shoulder 20.

A further variant of the fuel tank 1 according to the invention is shown in FIG. 4. The opening 5 in the tank wall 2 takes the form of a circumferential flanged ring 21, the bottom 22 of the flanged ring 21 facing the tank wall 2 being bevelled towards the outside, in such a way that the thickness of the flanged ring 21 reduces (radially) in an outwards direction from the opening 5.

The collar 12 of the filler neck 4 has an external diameter corresponding to that of the flanged ring 21. The top 23 of the collar 12 is likewise bevelled, sloping in a radially outward direction, such that the flanged ring 21 and collar 12 of the filler neck lying thereover when the two are brought together form a cross-sectionally trapezoidal shape. The filler neck 4 is held on the flanged ring 21 by means of a clamping ring 24, the clamping ring 24 comprising a cross-sectionally trapezoidal circumferential groove 25, which engages around the bottom 22 of the flanged ring 21 and the top 23 of the collar 12. The clamping ring 24 may be of one-part or indeed two-part construction. The depth and geometry of the groove 25 are so dimensioned that clamping in the circumferential direction brings about surface pressure between the flanged ring 21 and the collar 12 and thus also axial clamping of the components.

As in the above-described exemplary embodiments, sealing is achieved for example by an O-ring seal 11, which is embedded in a circumferential groove 10 in the filler neck 4.

List of Reference Numerals
1 Fuel tank
2 Tank wall
3 Barrier layer
4 Filler neck
5 Opening
6 Connecting insert
7 Flange
8 Collar
9 Inside of tank
10 Grooves
11 O-ring seals
12 Collar
13 Threaded ring
14 Union nut
15 Outwardly protruding portion
16 Inwardly protruding portion
17 Clamping ring
18 Projection
19 Step
20 Shoulder 21 Flanged ring
22 Bottom of flanged ring
23 Top of collar
24 Clamping ring
25 Groove

What is claimed is:

1. Motor vehicle fuel tank of thermoplastics having at least one filler neck not moulded on in one piece, the at least one filler neck being connected in a fluid-tight manner to the fuel tank, wherein the filler neck is inserted into an opening in the fuel tank and is sealed by sealing means at its outer circumference in the opening;
   wherein the filler neck is clamped axially against the tank wall by force applied to the filler neck in an axial direction of the filler neck; and
   wherein the filler neck comprises in a region of a connection to the wall of the fuel tank at least one circumferential collar which is secured axially against the wall of the fuel tank by a union nut which directly contacts against the collar and secures the collar to prevent separation of the connection.

2. Fuel tank according to claim 1, characterized in that the sealing and fastening of the filler neck are functionally separate.

3. Fuel tank according to claim 1, characterized in that the at least one circumferential collar is secured axially against the wall of the fuel tank by a union joint.

4. Fuel tank according to claim 1, characterized in that the opening in the tank wall is provided with a connecting insert, which is welded to the tank wall and relative to which the filler neck is sealed radially inside the fuel tank.

5. Fuel tank according to claim 4, characterized in that, in a region projecting into the fuel tank, the connecting insert consists at least partially of a material which does not swell up in the presence of liquid or gaseous hydrocarbons.

6. Fuel tank according to claim 4, characterized in that, in a region projecting into the fuel tank, the connecting insert is provided with a circumferential band of a material resistant to liquid and gaseous hydrocarbons.

7. Fuel tank according to claim 1, characterized in that the opening is provided in an inwardly or outwardly protruding portion of the tank wall.

8. Fuel tank according to claim 7, characterized in that the inwardly or outwardly protruding portion is encompassed by a band or a ring of a material which does not swell up in the presence of liquid or gaseous hydrocarbons.

9. Fuel tank according to claim 1, characterized in that the tank wall and the filler neck consist of a multilayer coextrudate of thermoplastics with at least one barrier layer for liquid or gaseous hydrocarbons.

\* \* \* \* \*